(12) United States Patent
Ursachi et al.

(10) Patent No.: US 11,494,499 B1
(45) Date of Patent: Nov. 8, 2022

(54) SEARCHING ENCRYPTED DATA STORES

(71) Applicant: Amazon Technologies, Inc., Seattle, WA (US)

(72) Inventors: Cristi Ursachi, Iasi (RO); Amanda Gray, Berlin (DE); Priti Marappan, San Francisco, CA (US); Dan Mutescu, Iasi (RO)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 79 days.

(21) Appl. No.: 17/182,930

(22) Filed: Feb. 23, 2021

Related U.S. Application Data (62) Division of application No. 16/137,987, filed on Sep. 21, 2018, now Pat. No. 11,003,783.

(51) Int. Cl.
| | |
|---|---|
| *G06F 21/60* | (2013.01) |
| *G06F 21/62* | (2013.01) |
| *H04L 9/30* | (2006.01) |
| *G06F 16/22* | (2019.01) |

(52) U.S. Cl.
CPC ........ *G06F 21/602* (2013.01); *G06F 16/2237* (2019.01); *G06F 21/6227* (2013.01); *H04L 9/30* (2013.01)

(58) Field of Classification Search
CPC .............. G06F 21/602; G06F 16/2237; G06F 21/6227; H04L 9/30
See application file for complete search history.

(56) References Cited

U.S. PATENT DOCUMENTS

| | | | | |
|---|---|---|---|---|
| 8,972,337 | B1* | 3/2015 | Gupta | G06F 16/221 |
| | | | | 707/602 |
| 2008/0059414 | A1* | 3/2008 | Cristofor | G06F 16/22 |
| 2012/0209873 | A1* | 8/2012 | He | G06F 16/2237 |
| | | | | 707/769 |
| 2012/0303633 | A1* | 11/2012 | He | G06F 16/2453 |
| | | | | 707/E17.051 |
| 2016/0299944 | A1* | 10/2016 | Isaacson | G06F 16/2453 |
| 2017/0250798 | A1* | 8/2017 | Enga | G06F 21/602 |
| 2018/0144152 | A1* | 5/2018 | Greatwood | G06F 21/602 |

* cited by examiner

*Primary Examiner* — Henry Tsang
(74) *Attorney, Agent, or Firm* — Thomas Horstemeyer, LLP (57) ABSTRACT

Disclosed are various embodiments for searching encrypted data stores. A first computing device can send a message authentication code (MAC) to a second computing device the MAC representing a tuple of a name of a data table, an identifier of a column of the data table, and a valid value for the column. Then, an encrypted bitmap can be received from the second computing device and decrypted to generate a decrypted bitmap. Bitwise operations can be performed on the decrypted bitmap to identify a plurality of encrypted rows of the data table containing a cell that comprises the valid value. Then, at least the plurality of at least partially encrypted rows of the data table can be requested from the second computing device and decrypted to generate a respective plurality of decrypted rows.

20 Claims, 6 Drawing Sheets

SEARCHING ENCRYPTED DATA STORES

CROSS-REFERENCE TO RELATED APPLICATIONS

This application is a divisional application of copending U.S. patent application Ser. No. 16/137,987, entitled "SEARCHABLE ENCRYPTED DATA STORES" and filed on Sep. 21, 2018, which is incorporated by reference as if set forth herein in its entirety.

BACKGROUND

Many organizations are moving data storage off-premises and into leased storage services or facilities, such as leased file stores or file servers, databases, database servers, or similar facilities. While the use of leased storage facilities allows for organizations to outsource the provisioning and maintenance of storage services, the provider of the leased storage services or facilities is able to access unencrypted data stored using their services or facilities. Although the data stored using the leased storage services or facilities can be encrypted prior to storage, encryption can limit the functionality of applications used by the organization to access, search, or modify the data.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various embodiments for creating encrypted data stores, such as encrypted databases, that can be searched using encrypted searches. The encrypted data stores and encrypted searches are implemented in a manner that the encrypted data stores can be hosted by services or devices controlled by third parties, and the encrypted searches can be implemented using the services or devices controlled by third parties without divulging the encrypted contents of the data store. In previous approaches, either an encrypted database hosted by a third party would have to be decrypted by the third party in order for a search to be performed using the third party's database engine, or the encrypted database would have to be downloaded to a client device and decrypted in order for the client to perform the search. In the first approach, the third party might be able to able to view the data in unencrypted form. In the second approach, the usefulness of a third party data store may be reduced because the client might have to keep a local copy in unencrypted form to execute searches, which may involve uploading and downloading the encrypted data multiple times.

As one skilled in the art will appreciate in light of this disclosure, certain embodiments may be capable of achieving certain advantages. For example, data may be stored and searched on a third-party machine or using a third-party service without divulging the unencrypted version of the data to the operator of the third-party machine or third-party service. As another example, implementations described in this application allow for encrypted searches of encrypted data to be performed with minimal overhead from the encryption compared to searching unencrypted data using unencrypted searches. In the following discussion, a general description of the system and its components is provided, followed by a discussion of the operation of the same.

Figure 1:
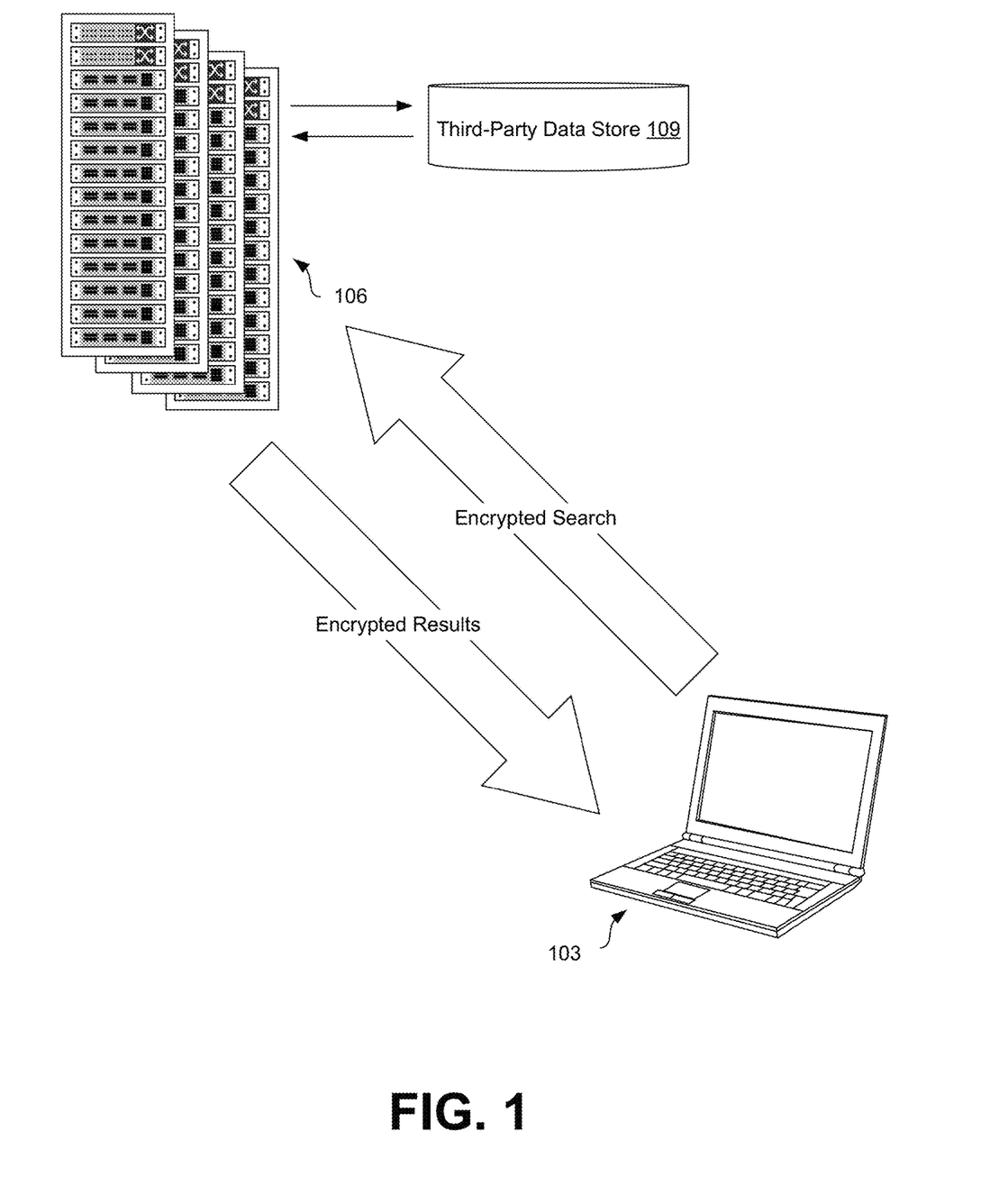
FIG. 1 is a drawing depicting one of several embodiments of the present disclosure.

As illustrated in FIG. 1, a client device 103 is in data communication with a computing environment 106, which are described in further detail in this application. The computing environment 106 hosts a third-party data store 109. The owner or operator of the client device 103 may wish to encrypt data stored on the third-party data store 109, or the computing environment 106, for a number of reasons. For example, the operator of the computing environment 106 or the provider of the third-party data store 109 may be a different entity or different entities than the operator of the client device 103. For instance, the operator of the client device 103 could be renting a virtual machine hosted by the computing environment 106 to implement a database server. Likewise, the operator of the client device 103 could be leasing space in the third-party data store 109 from an operator of a database server or data storage service. As a result, the operators of the computing environment 106 or the third-party data store 109 have access to any data stored by the computing environment 106 using the third-party data store 109.

In order to protect the data stored in the third-party data store 109, the client device 103 can encrypt the data to be stored by the third-party data store 109 prior to uploading the data to the third-party data store 109. As described later in this application, the data may be indexed and encrypted in a manner that allows for the client device 103 to send an encrypted search to the computing environment 106 and receive encrypted results in response. Because the search and the results are encrypted, the operator of the computing environment 106 or the third-party data store 109 is unable to access the encrypted data directly or infer the contents of the encrypted data indirectly by intercepting the encrypted search or the encrypted results.

It should be noted, however, that some implementations may obfuscate rather than encrypt the various data or data structures described herein. Although obfuscation and encryption have the same goal—to hide the true nature of the underlying data from an outside observer—they involve slightly different implementations. Obfuscation involves a method, process, technique or algorithm that can transform data from one form or format into another form or format. An example of an obfuscation approach is Base64 encoding of data. Anyone who knows the method, process, technique, or algorithm used can reverse the operation to deobfuscate the data. In contrast, encryption involves a method, process, technique, or algorithm that can transform data using an encryption key. Different encryption keys will cause the same algorithm to transform the same data into different encrypted forms. Unlike obfuscation, even if one knew the encryption algorithm used, they would not be able to reverse the encryption operation to reveal the encrypted data unless they also had access to the encryption key. Although numerous references are made throughout to encryption, encrypted data, and unencrypted data, it is to be understood that various obfuscation approaches, techniques or algorithms could be used in place of an encryption algorithm to generate obfuscated data or deobfuscated data.

Figure 2:
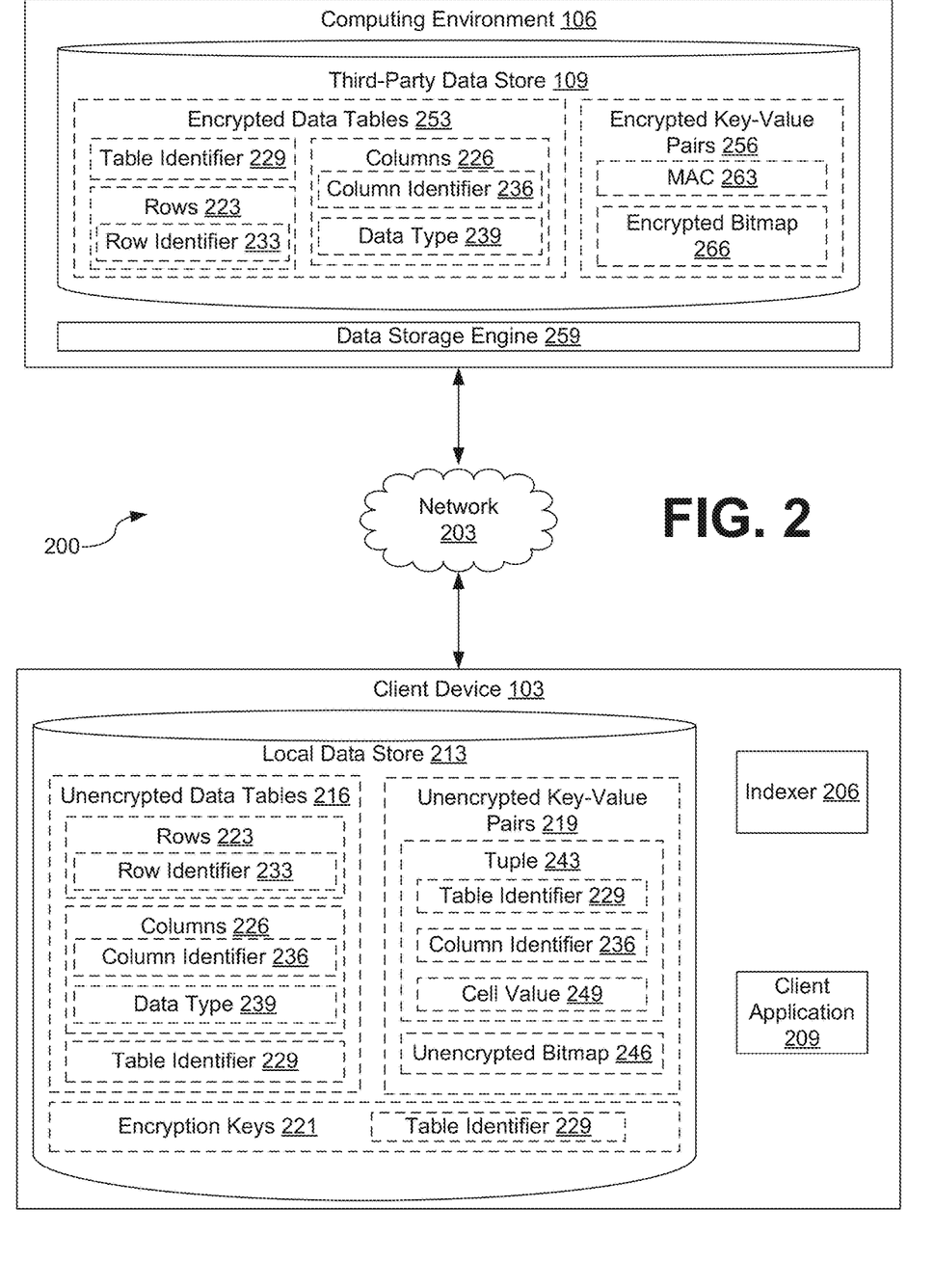
FIG. 2 is a drawing of a networked environment according to various embodiments of the present disclosure.

With reference to FIG. 2, shown is a networked environment 200 according to various embodiments. The networked environment 200 includes the client device 103 and the computing environment 106, which are in data communication with each other via a network 203. The network 203 includes wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 203 can also include a combination of two or more networks 203. Examples of networks 203 can include the Internet, intranets, extranets, virtual private networks (VPNs), and similar networks.

The client device 103 is representative of one or more client devices that may be coupled to the network 203. The client device 103 may include, for example, a processor-based system such as a computer system. Such a computer system may be embodied in the form of a server computer (e.g., a rack-mount server, a tower server, or similar implementation), a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 103 may include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display may be a component of the client device 103 or may be connected to the client device 103 through a wired or wireless connection.

The client device 103 may be configured to execute various applications. These applications may include an indexer 206 and a client application 209. Other applications may also be executed by the client device 103 in various embodiments of the present disclosure.

Also, various data may be stored in a local data store 213 that is hosted by or otherwise accessible to the client device 103. The local data store 213 may be representative of a plurality of local data stores 213, which can include relational databases, object-oriented databases, document-oriented databases, hierarchical databases, hash tables or similar key-value data stores, as well as other data storage applications or data structures. The data stored in the local data store 213 is associated with the operation of the various applications or functional entities described below. This data can include one or more unencrypted data tables 216, one or more unencrypted key-value pairs 219, one or more encryption keys 221, and potentially other data.

An unencrypted data table 216 may be used to store data in individual cells. The cells in an unencrypted data table 216 are formed from the intersection of one or more rows 223 with one or more columns 226. An unencrypted data table 216 may also include a table identifier 229 to identify or otherwise distinguish one unencrypted data table 216 from another unencrypted data table 216.

Each row 223 may represent a set or tuple of related data values stored in a series of columns 226 in the unencrypted data table 216. Accordingly, each row 223 in the unencrypted data table 216 may represent a unique record or entry stored in the unencrypted data table. The intersection of each row 223 and each column 226 forms a cell representing a data value for a particular element of the record represented by the respective row 223. Each row 223 may have an associated row identifier 233 that allows for each row 223 in the unencrypted data table 216 to be uniquely identified with respect to other rows 223 in the unencrypted data table 216. In some embodiments, the row identifier 233 may be stored in a cell formed from the intersection of the row 233 and a column 226 specified for or dedicated to providing a unique identifier or primary key for each row 223.

Each column 226 may represent a set of data values of a particular type. For example, a column 226 could represent the bank account numbers of bank customers in bank's customer database. Accordingly, a column may include a column identifier 236 and specify a data type 239.

The column identifier 236 may represent a name or other identifier that allows for a column 226 in an unencrypted data table 216 to be uniquely identified with respect to other columns 226 in the unencrypted data table 216. For example, a column identifier 236 for account numbers of customers of bank could be specified as the character string "ACCOUNT NUMBERS." Other types of identifiers could also be used as the column identifier 236, such as numeric identifiers, according to various embodiments of the present disclosure.

The data type 239 specifies the type of data that may be stored in a column 226. In some instances, the data type 239 may also specify the range or type of permitted values that may be stored in the column 226. For example, the data type 239 could specify that only integers may be stored in the column 226. As another example, the data type 239 could further specify that only unsigned integers could be stored in the column 226 (e.g., only integers greater than or equal to zero) or that only integers between 0 and 150 may be stored in the column (e.g., as values for the age of individual customers in a customer database). Other examples of data types 239 include floating point numbers, character strings, alphabetical character strings (e.g. character strings without Arabic numerals), character strings with a specified maximum permitted number of characters, binary blobs, etc.

The table identifier 229 may represent a unique identifier for the unencrypted data table 216 with respect to other unencrypted data tables 216 stored in the local data store 213. In some embodiments, the table identifier 229 may include a character string that represents an alphanumeric name of the unencrypted data table 216. However, other forms of table identifiers 229 may also be used in various embodiments of the present disclosure.

An unencrypted key-value pair 219 may be used to index values of individual cells of each row 223 in a column 226 of an unencrypted data table 216. The unencrypted key-value pair 219 may include a tuple 243 as a key and a respective unencrypted bitmap 246 as a value.

The tuple 243 represents an identifier for cells within an unencrypted data table 216 that have a particular value. Accordingly, a tuple 243 may include the table identifier 229 of an unencrypted data table 216, the column identifier 236 of a column 226 in the unencrypted data table 216, and a cell value 249 for individual cells in the data column 226.

The unencrypted bitmap 246 is a bitmap data structure representing an index of all rows 223 in an unencrypted data table 216 that contain a cell in a column 226 identified by the column identifier 236 specified in the tuple 243 that has a cell value 249 specified in the tuple 243. In some implementations, each row 223 that contains a cell in the specified column 226 that stores the specified cell value 249 may be represented by a bit set to the value of "1" in a string of bits. For example, if an unencrypted data table 216 had eight rows 223 representing eight individual customers and a column 226 representing the age of individual customers, an eight-bit unencrypted bitmap 246 could be used to represent an index of the rows 223 with a cell value 249 matching the cell value 249 specified in the tuple 243.

To further illustrate the example, suppose the following unencrypted data table 216 depicted in Table 1 stored eight customer records in eight rows 223. The unencrypted data table 216 also has three columns 226. The first column 226 represents a row identifier 233. The second column 226 represents a customer name. The third column 226 represents a customer age.

TABLE 1

| Customer ID | Customer Name | Customer Age |
|---|---|---|
| 1 | Janet Doe | 19 |
| 2 | John Doe | 27 |
| 3 | Jane Doe | 32 |
| 4 | Sara Doe | 65 |
| 5 | Jim Doe | 46 |
| 6 | Jacob Doe | 27 |
| 7 | Samantha Doe | 56 |
| 8 | Nikola Doe | 32 |

In this example, a first eight-bit unencrypted bitmap 246 of "01000100" could be used to represent an index of all customers with an age of "27." This first eight-bit unencrypted bitmap 246 could be identified by the tuple 243 where the column identifier 236 is "Customer Age," the cell value 249 is "27" and the table identifier 229 is "TABLE 1." A second eight-bit unencrypted bitmap 246 of "00100001" could be used to represent an index of all customers with an age of "32." Additional unencrypted bitmaps 246 could be used for each possible cell value 249 for the "Customer Age" column 226. For instance, the unencrypted bitmap 246 of "00000000" could be used to represent that there are no customers in the unencrypted data table 216 with an age of "30."

For large data sets or sparse data sets, compressed versions of the unencrypted bitmap 246 may be used to improve storage efficiency or processing speed. For example, in an unencrypted data table 216 with one-million rows 223, an unencrypted bitmap 246 with only a small number of bits set to "1" (e.g., two bits out of one-million, one-thousand bits out of one-million, etc.) would consume a lot of space and require a lot of processor resources to identify the small number of rows 223 represented by the unencrypted bitmap 246. Accordingly, related data structures, such as roaring bitmaps or run-length encoded bitmaps, may be used in some implementations to store an unencrypted bitmap 246 in a compressed form or process the unencrypted bitmap 246 in an efficient manner. Likewise, the unencrypted bitmap 246 may be stored in a compressed form to save storage space but decompressed prior to processing by the various applications described herein.

The encryption keys 221 are cryptographic keys that may be used to encrypt the unencrypted data tables 216 or unencrypted key-value pairs 219, or portions thereof, to generate encrypted data tables 253 or encrypted key-value pairs 256, as further described in this application. The encryption keys 221 may likewise be used to decrypt the encrypted data tables 253 or encrypted key-value pairs 256, or portions thereof, to access encrypted data. Encryption keys 221 may include symmetric encryption keys 221 used in symmetric encryption algorithms or public-private key pairs containing a public encryption key 221 and a corresponding private encryption key 221 for use with asymmetric encryption algorithms. In some embodiments, separate encryption keys 221 may be used for encrypting separate unencrypted data tables 216. In these embodiments, each encryption key 221 may be stored in association with a respective table identifier 229 for the unencrypted data table 216.

The indexer 206 may be executed by the client device 103 to perform various actions on the data contained in the local data store 213. For example, the indexer 206 may be executed to generate unencrypted bitmaps 246 for an unencrypted data table 216 and store them in respective unencrypted key-value pairs 219. The indexer 206 may also be executed to encrypt the unencrypted data tables 216 and the unencrypted key-value pairs 219 using the encryption keys 221 to generate respective encrypted data tables 253 and encrypted key-value pairs 256. The indexer 206 may be further executed to store the encrypted data tables 253 and the encrypted key-value pairs 256 in the third-party data store 109. One or more of these operations may be performed by the indexer 206 automatically or in response to specified triggers or conditions. One or more of these operations may also be performed by the indexer 206 in response to a request or instruction received from another application, such as the client application 209, to index one or more unencrypted data tables 216 or to encrypt one or more of the unencrypted data tables 216 or unencrypted key-value pairs 219. Although the indexer 206 is depicted in as executing on the same client device 103 that hosts the local data store 213, in some embodiments the indexer 206 may be executed by a first client device 103 and the local data store 213 may be hosted by a second, trusted client device 103.

The client application 209 may be executed in a client device 103, for example, to access encrypted data stored in the encrypted data tables 253 stored by the computing environment 106 or other servers. In some implementations, the client application 209 may render a user interface on the display, such as one or more search results obtained in response to a search query submitted to the data storage engine 259. To this end, the client application 209 may include, for example, a browser, a dedicated application, or other executable, and the user interface may include a network page, an application screen, or other user mechanism for obtaining user input. Although the client application 209 is depicted in as executing on the same client device 103 that hosts the local data store 213, in some embodiments the client application 209 may be executed by a first client device 103 and the local data store 213 may be hosted by a second, trusted client device 103.

The computing environment 106 may include, for example, a server computer or any other system providing computing capability. Alternatively, the computing environment 106 may employ a plurality of computing devices that may be arranged, for example, in one or more server banks or computer banks or other arrangements. Such computing devices may be located in a single installation or may be distributed among many different geographical locations. For example, the computing environment 106 may include a plurality of computing devices that together may include a hosted computing resource, a grid computing resource or any other distributed computing arrangement. In some cases, the computing environment 106 may correspond to an elastic computing resource where the allotted capacity of processing, network, storage, or other computing-related resources may vary over time.

Various applications or other functionality may be executed in the computing environment 106 according to various embodiments. The components executed on the computing environment 106, for example, include a data storage application 259, and other applications, services, processes, systems, engines, or functionality not discussed in detail herein. The data storage engine 259 can be executed to store encrypted data tables 253 and encrypted key-value pairs 256 provided by the indexer 206 and to return search results in response to searches or search queries executed by the client application 209.

Also, various data is stored in a third-party data store 109 that is accessible to the computing environment 106. The third-party data store 109 may be representative of a plurality of third-party data stores 109, which can include relational databases, object-oriented databases, document-oriented databases, hierarchical databases, hash tables or similar key-value data stores, as well as other data storage applications or data structures. The data stored in the third-party data store 109 is associated with the operation of the various applications or functional entities described below. This data can include encrypted data tables 253, encrypted key-value pairs 256, and potentially other data.

The encrypted data table 253 represents an encrypted version of a corresponding unencrypted data table 216. Accordingly, the table identifiers 229, rows 223, and columns 226 present in the corresponding unencrypted data table 216 are also present in the encrypted data table 253. Some of these elements may also be present in encrypted form.

For example, the contents of individual cells in the encrypted data table 253 may be encrypted, as well as the column identifier 236 and the data type 239, in order to obfuscate or protect the data stored in encrypted data table 253 but also to protect relevant metadata of the encrypted data table 253. Row identifiers 233 may be encrypted as well. However, in some embodiments, the row identifier 233 may remain in plaintext to simplify searches. For example, where row identifiers 233 are sequential numbers indicating whether a row is a first row, a second row, a third row, etc., in the encrypted data table, the row identifiers 233 may remain unencrypted to simplify searching as an ordinal position of a row 223 in the encrypted data table 253 is unlikely to leak any information about the contents of the encrypted data table 253 itself.

In some embodiments, the table identifier 229 of the encrypted data table 253 may be stored as a cryptographic hash of the table identifier 229 of the respective unencrypted data table 216 in order to avoid revealing information about the contents of the encrypted data table 253. For example, the table identifier 229 "Customer Account Balances" would provide information about the contents of the encrypted data table 253, and therefore the cryptographic hash of the table identifier 229 of the unencrypted data table 216 may be stored as the table identifier 229 of the encrypted data table 253. In other embodiments, however, the table identifier 229 of the encrypted data table 253 may be stored in unencrypted form in the same manner as the table identifier 229 for the unencrypted data table 216. This might be done, for example, to avoid the risk of hash collisions resulting in reads from the wrong encrypted data table 253. The encrypted data tables 253, or portions thereof, may be generated using one or more of the encryption keys 221.

The encrypted key-value pair 256 represents an encrypted version of a corresponding unencrypted key-value pair 219. The encrypted key-value pair 256 includes a message authentication code (MAC) 263 as a key and an encrypted bitmap 266 as the value. The MAC 263 represents a hash of the tuple 243 of the corresponding unencrypted key-value pair 219, allowing each encrypted key-value pair 256 to be uniquely identified with respect to other encrypted key-value pairs 256. Examples of MACs 263 include hash-based message authentication codes (HMACs), one-key message authentication codes (OMACs), cipher-based message authentication codes (CMACs), message authentication codes based on universal hashing (e.g., UMACs and VMACs), among various implementations. The encrypted bitmap 266 represents an encrypted version of the corresponding unencrypted bitmap 246 of the corresponding unencrypted key-value pair 219. The MAC 263 and the encrypted bitmap 266 may be generated using one more of the encryption keys 221.

Next, a general description of the operation of the various components of the networked environment 200 is provided. A more detailed description of the operation of individual components is provided herein and further illustrated by the subsequent figures.

To begin, one or more unencrypted data tables 216 are stored in the local data store 213. The unencrypted data tables 216 may be transferred to the local data store 213 from another source (e.g., a data warehouse), or a database or data service may use the local data store 213 as a primary storage mechanism for the unencrypted data tables 216. One or more encryption keys 221 may also be loaded into or otherwise stored in the local data store 213. For example, the indexer 206 may generate the encryption keys 221 and store them in the local data store 213. As another example, the encryption keys 221 may be retrieved by the indexer 206 from a key distribution service or similar key provider.

The indexer 206 then generates unencrypted bitmaps 246 to index each column 226 in an unencrypted data table 216. In some embodiments, the indexer 206 may generate an unencrypted bitmap 246 for each potential or permitted value in a column 226. In addition, the indexer 206 may also generate an unencrypted bitmap 246 for each potential or permitted range of values for a column 226 in some embodiments. However, the indexer 206 may alternatively generate unencrypted bitmaps 246 for specified values or specified ranges of values for a column 226. For example, if a column 226 has a data type 239 for unsigned integers between the values of zero and one-hundred fifty to represent the age of customers, the indexer 206 may generate an unencrypted bitmap 246 for each age between zero and one-hundred and fifty. If a range between zero and seventeen, inclusive, were also specified (e.g., to select all customers who were minors), the indexer 206 could also generate an unencrypted bitmap 246 identifying each row 223 of the unencrypted data table 216 where the age of a customer was less than or equal to seventeen.

As the indexer 206 generates an unencrypted bitmap 246, the indexer 206 may also compress the unencrypted bitmap 246 to conserve storage space. In some embodiments, the indexer 206 may instead use a bitmap data structure that includes compression features, such as roaring bitmaps or similar data structures.

As the indexer 206 generates each unencrypted bitmap 246, the indexer 206 may also store the unencrypted bitmap 246 in an unencrypted key-value pair 219. Accordingly, the indexer 206 may generate a tuple 243 that represents the table identifier 229 of the unencrypted data table 216, column identifier 236 of the column 226, and a cell value 249 for which the unencrypted bitmap 246 provides an index. For example, if an unencrypted data table 216 had the table identifier 229 of "Customers" and a column identifier 236 of "Age," and the indexer 206 were indexing all rows 223 in the unencrypted data table 216 where the "Age" column 226 had a cell value 249 of forty-nine, the indexer 206 might create a tuple 243 of "Customers| Age| 49" to use as the key for the unencrypted key-value pair 219 for the respective unencrypted bitmap 246.

After the indexer 206 has created all of the desired unencrypted bitmaps 246 and stored them in unencrypted key-value pairs 219, the indexer 206 may then encrypt the unencrypted data tables 216 and unencrypted key-value pairs 219 using one or more encryption keys 221 to generate respective encrypted data tables 253 and encrypted key-value pairs 256. To generate an encrypted data table 253, the indexer 206 may encrypt each row 223 or column 226. In some instances, the table identifier 229 may remain unencrypted for easy identification of a data table in its encrypted form. However, in other instances, the table identifier 229 may be cryptographically hashed in some form so that an encrypted data table 253 can be correctly identified using an unencrypted table identifier 229 without disclosing the table identifier 229 itself to the provider of the third-party data store 109. Similarly, the indexer 206 may encrypt the unencrypted bitmap 246 with an encryption key 221 and use a cryptographic hash function to generate the MAC 263 from the tuple 243. The MAC 263 and the encrypted bitmap 266 could then be stored as an encrypted key-value pair 256 in the third-party data store 109.

After the encrypted data tables 253 and encrypted key-value pairs 256 have been created, the indexer 206 may send them to the data storage engine 259. The data storage engine 259 then loads or otherwise stores the encrypted data tables 253 and the encrypted key-value pairs 256 in the third-party data store 109. Once the encrypted data tables 253 and the encrypted key-value pairs 256 have been stored in the third-party data store 109, the indexer 206 may delete or otherwise remove the unencrypted data tables 216 and the unencrypted key-value pairs 219 from the local data store 213 in some implementations. The indexer 206 may delete the unencrypted data from the local data store 213 for data privacy or protection purposes. For example, while any desired rows 223 can be retrieved from the encrypted data table 253 and decrypted using an encryption key 221, leaving them in unencrypted form in the local data store 213 of the client device 103 risks losing control of the data should the client device 103 ever be compromised.

To search the third-party data store 109, a client application 209 may perform the following sequence of operations. For instance, a client application 209 may attempt to execute a predefined search query or a search query provided by a user of the client application 209. To continue using the illustrative example previously provided by TABLE 1, the client application 209 may search an encrypted data table 253 for the names all customers who are thirty-two years of age. An example of such a search query in Structured Query Language (SQL) might look like "SELECT 'Customer Name' FROM Customers WHERE 'Customer Age'=32."

Accordingly, the client application 209 could parse the search query to determine that the table identifier 229 is "Customers," the column identifier 236 is "Customer Age," and the cell value 249 is "32." The client application 209 could then create the tuple 243 of "Customers| 'Customer Age' | 32" and use the appropriate encryption key 221 to generate an MAC 263 from the tuple 243. However, if the search query is a prepared or previously defined search query, parsing might not be necessary as the tuple 243 may already be stored or otherwise cached.

The client application 209 could then send the MAC 263 to the data storage engine 259 as part of a request for an encrypted bitmap 266 that is stored in an encrypted key-value pair 256 identified by the MAC 263. The data storage engine 259 could then return the appropriate encrypted bitmap 266 to the client application 209 in response.

Upon receiving the encrypted bitmap 266 from the data storage engine 259, the client application 209 may decrypt it using the appropriate encryption key 221 to generate the unencrypted bitmap 246. In some embodiments, the client application 209 may also decompress the unencrypted bitmap 246 after decryption occurs.

The client application 209 can then parse the unencrypted bitmap 246 to determine which bits are set to a prespecified value, such as "1," to determine which rows 223 of the encrypted data table 253 are responsive to the query or otherwise match the cell value 249. Using the example of TABLE 1, the unencrypted bitmap 246 would be "00100001" for those customers aged thirty-two. This unencrypted bitmap 246 indicates that the third and eighth rows 223 of the encrypted data table 253 are for customers who are aged thirty-two.

After identifying the rows 223 that the unencrypted bitmap 246 indicates match the query, the client application 209 can send a second request to the data storage engine 259. The second request can include row identifiers 233 for each row 223 in the encrypted data table 253 that have been identified by the unencrypted bitmap 246. In some implementations, the client application 209 may also include additional row identifiers 233. The presence of the additional row identifiers 233 can help obscure or otherwise obfuscate which rows 223 the client application 209 is requesting in response to the query. The data storage engine 259 may then provide in a response the rows 223 that match the row identifiers 233 provided by the client application 209.

Upon receiving the rows 223 of the encrypted data table 253 from the data storage engine 259, the client application 209 may decrypt the rows 223. For example, the client application 209 may decrypt the rows 223 using one or more of the encryption keys 221. As a result, the client application 209 is able to access the contents of the encrypted data table 253 in unencrypted form. Moreover, the operator of the computing environment 106 and the operator of the third-party data store 109 are unable to view the contents of the encrypted data table 253 in unencrypted form or deduce information about the encrypted data table 253 from the search query itself.

Figure 3:
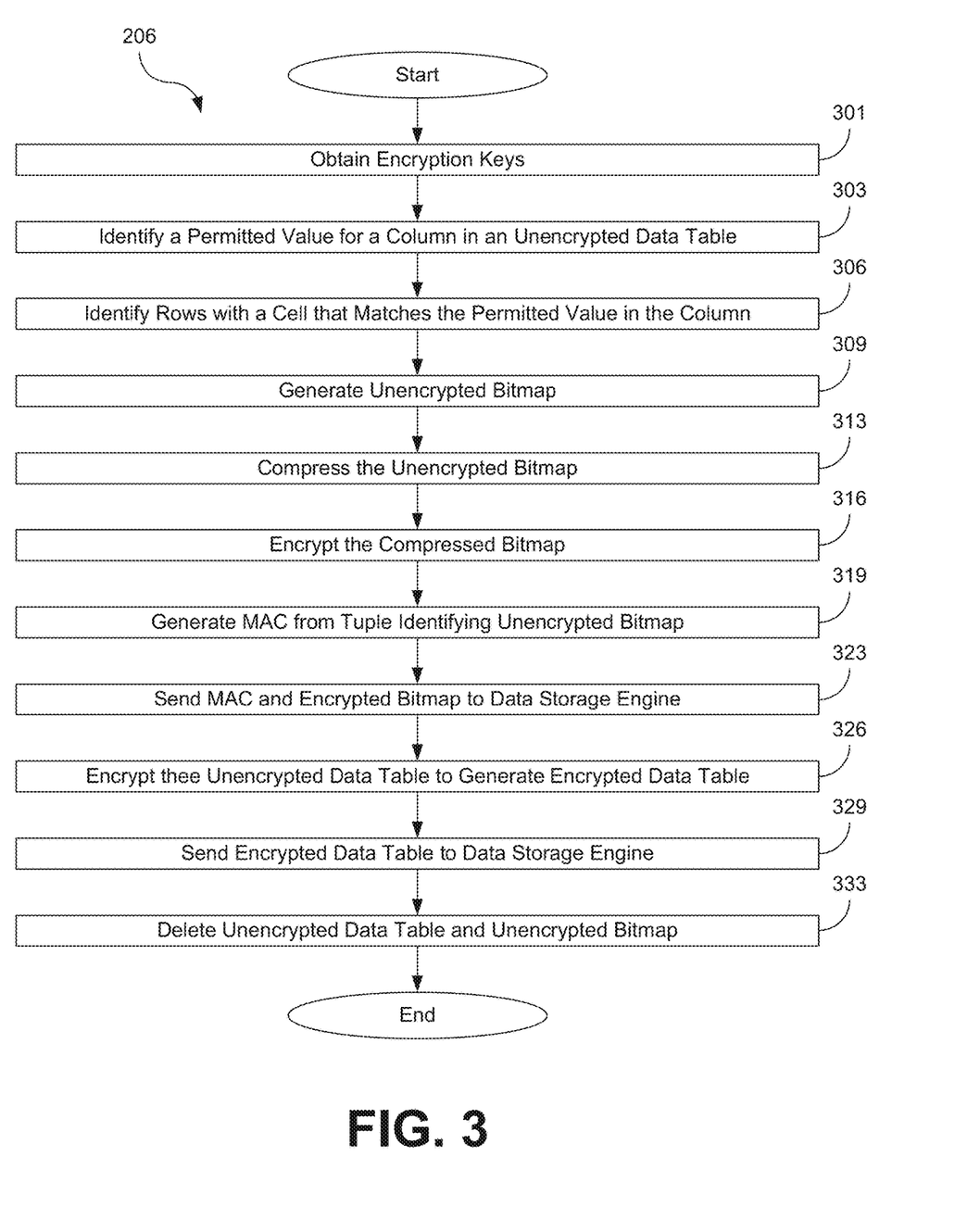
FIGS. 3-5 are flowcharts illustrating examples of functionality implemented as portions of an application executed in a computing environment in the networked environment of FIG. 2 according to various embodiments of the present disclosure.

Referring next to FIG. 3, shown is a flowchart that provides one example of the operation of a portion of the indexer 206 according to various embodiments. It is understood that the flowchart of FIG. 3 provides merely an example of the many different types of functional arrangements that may be employed to implement the operation of the portion of the indexer 206 as described herein. As an alternative, the flowchart of FIG. 3 may be viewed as depicting an example of elements of a method implemented in the client device 103 (FIG. 2) according to one or more embodiments.

Beginning with box 301, the indexer 206 may obtain one or more encryption keys 221 (FIG. 2) for use in generating encrypted data tables 253 (FIG. 2), MACs 263 (FIG. 2), and encrypted bitmaps 266 (FIG. 2) if the encryption keys 221 are not already present in the local data store 213 (FIG. 2). For example, the indexer 206 may authenticate itself with a key distribution service or similar cryptographic provider and receive the appropriate encryption keys 221 in response.

Then at box 303, the indexer 206 may identify a permitted value for a column 226 (FIG. 2) in an unencrypted data table 216 (FIG. 2). In some instances, the permitted value may be previously specified. For example, the value or values to use may have been specified by a user during an earlier configuration phase. In other instances, the indexer 206 may identify the range or set of permitted values from the data type 239 (FIG. 2) specified for the column 226. For example, if the data type 239 specifies a 32-bit field storing unsigned integers, then the indexer 206 may identify any integer between zero and $2^{32}-1$ as a permitted value.

Moving on to box 306, the indexer 206 may then identify individual rows 223 (FIG. 2) that contain a cell in the column 226 that has a cell value 249 that matches the permitted value identified at box 303. For example, if the indexer 206 is operating on the permitted value of 15,434,976 for a column representing 32-bit unsigned integers, then the indexer 206 will identify each row 223 where the value of the cell in the column 226 is equal to 15,434,976. This may be performed using any search functionality or query functionality provided by the local data store 213 (e.g., SQL queries, etc.).

Next at box 309, the indexer 206 may generate an unencrypted bitmap 246 (FIG. 2) representing the row identifiers 233 (FIG. 2) of the rows 223 identified at box 306. For example, if there are one-million rows 223 in the unencrypted data table 216, then a one-million bit long unencrypted bitmap 246 may be used, and a respective bit for each row 223 identified at box 306 may be set to a predefined value, such as "1," while all other rows may be set to another predefined value, such as "0." For example, if the second, seventh, and one-thousandth rows 233 in the unencrypted data table 216 were identified at box 306, then the second, seventh, and one-thousandth bits in the unencrypted bitmap 246 could be set to "1" while all other bits could be set to "0."

Proceeding to box 313, the indexer 206 may compress the unencrypted bitmap 246 to generate a compressed version of the unencrypted bitmap 246. Various compression techniques can be used as appropriate for a particular implementation, such as run-length encoding techniques. In some embodiments, specialized bitmap data structures that inherently provide for data compression, such as roaring bitmaps, may be used.

Then at box 316, the indexer 206 may encrypt the compressed version of the unencrypted bitmap 246 to generate an encrypted bitmap 266. For example, the indexer 206 may encrypt the compressed version of the unencrypted bitmap 246 using the encryption keys 221. Various encryption techniques may be used according to various embodiments of the present disclosure. For example, symmetric encryption may be used to allow for quicker encryption of data. In other instances, asymmetric encryption may be used. In these embodiments, multiple client devices 103 could store encrypted bitmaps 266 to the third-party data store 109 using a public encryption key 221, while only a limited number of authorized client devices 103 would be able to read data from the third-party data store 109 using the corresponding private encryption key 221.

Moving on to box 319, the indexer 206 may generate an MAC 263 associated with the encrypted bitmap 266. The MAC 263 may be generated using the tuple 243 (FIG. 2) that identifies the unencrypted bitmap 246 and one of the encryption keys 221.

Next at box 323, the indexer 206 may then send the encrypted bitmap 266 and the MAC 263 to the data storage engine 259 (FIG. 2) for storage in the third-party data store 109 (FIG. 2).

In some embodiments, the actions performed by the indexer 206 may be performed repeatedly in order to generate a complete set of encrypted bitmaps 266 and respective MACs 263 for an unencrypted data table 216. For example, for each column 226 in an unencrypted data table 216, the indexer 206 may generate an MAC 263 and an encrypted bitmap 266 for each possible value or range of permitted or valid values for the column 226. The particular number and type of encrypted bitmaps 266 created for a particular data table 216 may be previously specified or configured according to the specifications of any particular implementation.

Proceeding to box 326, the indexer 206 may encrypt the unencrypted data table 216. For example, the indexer 206 may encrypt at least a portion of the data table 216 using an encryption key 221 to generate an encrypted data table 253 (FIG. 2). To generate the encrypted data table 253, the indexer 206 may encrypt each row 223 or column 226 using the encryption key 221. In some instances, the table identifier 229 may remain unencrypted for easy identification of a data table in its encrypted form. However, in other instances, the table identifier 229 may be cryptographically hashed in some form so that an encrypted data table 253 can be correctly identified using an unencrypted table identifier 229 without disclosing the table identifier 229 itself to provider of the third-party data store 109. Row identifiers 233 may be encrypted as well in some implementations. However, in some embodiments, the row identifier 233 may remain in plaintext form in the encrypted data table 253 to simplify searches. For example, where row identifiers 233 are sequential numbers that indicate whether a row is a first row, a second row, a third row, etc., in the encrypted data table, then the row identifiers 233 may remain unencrypted to simplify searching as an ordinal position of a row 223 in the encrypted data table 253 is unlikely to leak any information about the contents of the encrypted data table 253 itself.

It should be noted that in some embodiments, only a portion of the unencrypted data table 216 may be encrypted. For example, rather than encrypting each row 223 or column 226, only a subset or rows 223, columns 226, or cells containing sensitive data may be encrypted or otherwise protected. This could be done to optimize performance where extra processing involved in encrypting and decrypting particular data fields is not necessary for specific values in specific rows 223, columns 226, or cells.

Then at box 329, the indexer 206 may send the encrypted data table 253 to the data storage engine 259 for storage in the third-party data store 109. Moving on to box 333, the indexer 206 may then delete the unencrypted data table 216 and the unencrypted bitmaps 246 from the local data store 213. Thereafter, the operation of the depicted portion of the indexer 206 ends.

Figure 4:
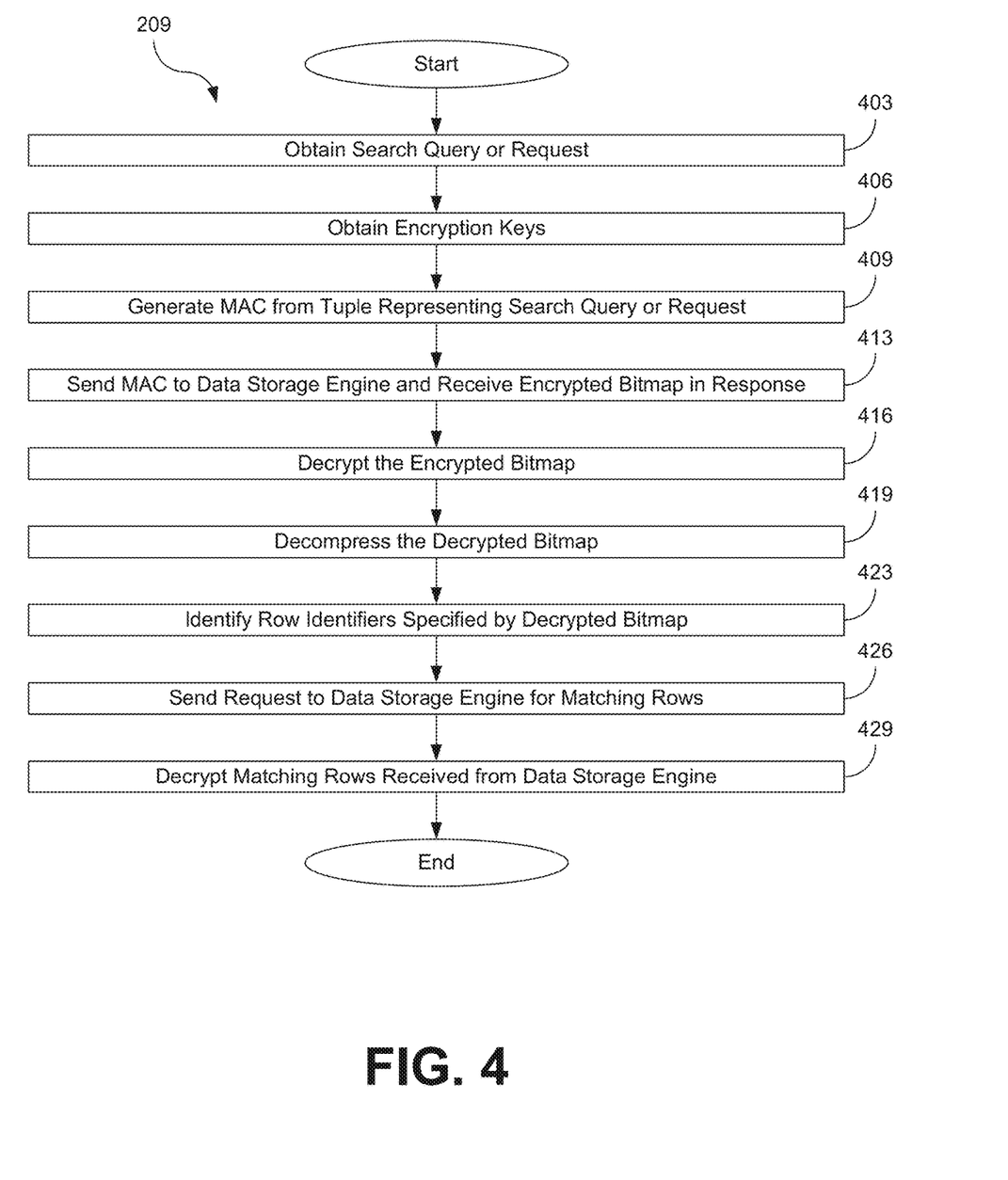

Referring next to FIG. 4, shown is a flowchart that provides one example of the operation of a portion of the client application 209 according to various embodiments. It is understood that the flowchart of FIG. 4 provides merely an example of the many different types of functional arrangements that may be employed to implement the operation of the portion of the client application 209 as described herein. As an alternative, the flowchart of FIG. 4 may be viewed as depicting an example of elements of a method implemented in the client device 103 (FIG. 2) according to one or more embodiments.

Beginning with box 403, the client application 209 obtains a search query or a search request. The search query or search request can be obtained from any number of sources. For example, the search query could be a prepared search query that the client application 209 is configured to execute at periodic intervals (e.g., a status report). As another example, the search query could be supplied by a user through a user interface provided by the client application 209.

Next at box 406, the client application 209 determines the table identifier 229 (FIG. 2) of the encrypted data table 253 (FIG. 2) and obtains a respective encryption key 221 (FIG. 2) associated with the table identifier 229. For example, if the search query specifies the table identifier 229, the client application 209 may parse the search query to determine the table identifier 229 in order to obtain the respective encryption key 221. In some embodiments, the client application 209 may supply the table identifier 229 to a key distribution service or similar cryptographic provider to obtain the cryptographic key 221.

Then at box 409, the client application 209 may use a cryptographic hash function to generate the MAC 263 from a tuple 243 (FIG. 2) representing the search query or search request. In some embodiments, the tuple 243 may be identified by parsing the search query. For example, given the SQL query "SELECT * FROM Users Where Age=39," the client application 209 could determine that the table identifier 229 is "Users," the column identifier 236 (FIG. 2) is "Age," and the cell value 249 (FIG. 2) is "39." In other embodiments, the tuple 243 may be specified in advance, such as those implementations where a previously prepared query is used.

Proceeding to box 413, the client application 209 the sends the MAC 263 to the data storage engine 259 (FIG. 2). In response, the client application 209 receives an encrypted bitmap 266 (FIG. 2) identified by the MAC 263 from the data storage engine 259.

Moving on to box 416, the client application 209 may decrypt the encrypted bitmap 266 to generate an unencrypted bitmap 246 (FIG. 2). The client application 209 may use the encryption key 221 to perform the decryption operation.

Next at box 419, the client application 209 may decompress the unencrypted bitmap 246. However, some embodiments may make use of bitmap data structures that inherently provide for data compression, such as roaring bitmaps.

Then at box 423, the client application 209 determines which rows 223 match the cell value 249 of the tuple 243 associated with the unencrypted bitmap 246. For example, the client application 209 can parse the unencrypted bitmap 246 to determine which bits are set to a prespecified value, such as "1," to determine which rows 223 (FIG. 2) of the encrypted data table 253 are responsive to the query. For example, the client application 209 may use bitshift operations to iterate through the unencrypted bitmap 246 to determine which bits are set.

Proceeding to box 426, the client application 209 sends the row identifiers 233 (FIG. 2) to the data storage engine 259 of the rows 223 identified at box 423. In some implementations, the client application 209 may also send additional row identifiers 233 of additional rows 223 beyond those indexed by the unencrypted bitmap 246. The inclusion of the additional row identifiers 233 may serve to obfuscate the parameters of the search to an observer operating the third-party data store 109.

In response, the client application 209 receives from the data storage engine 259 the rows 223 of the encrypted data table 253 identified by the row identifiers 233. Moving on to box 429, the client application 209 then decrypts the rows 223 received from the data storage engine 259. For example, the client application 209 could decrypt the received rows 223 using the encryption key 221 to access the records represented by the rows 223. If the client application 209 had included additional row identifiers 233 at box 426, the client application 209 may discard or otherwise ignore these additional rows. Thereafter, the operation of the depicted portion of the client application 209 ends.

Figure 5:
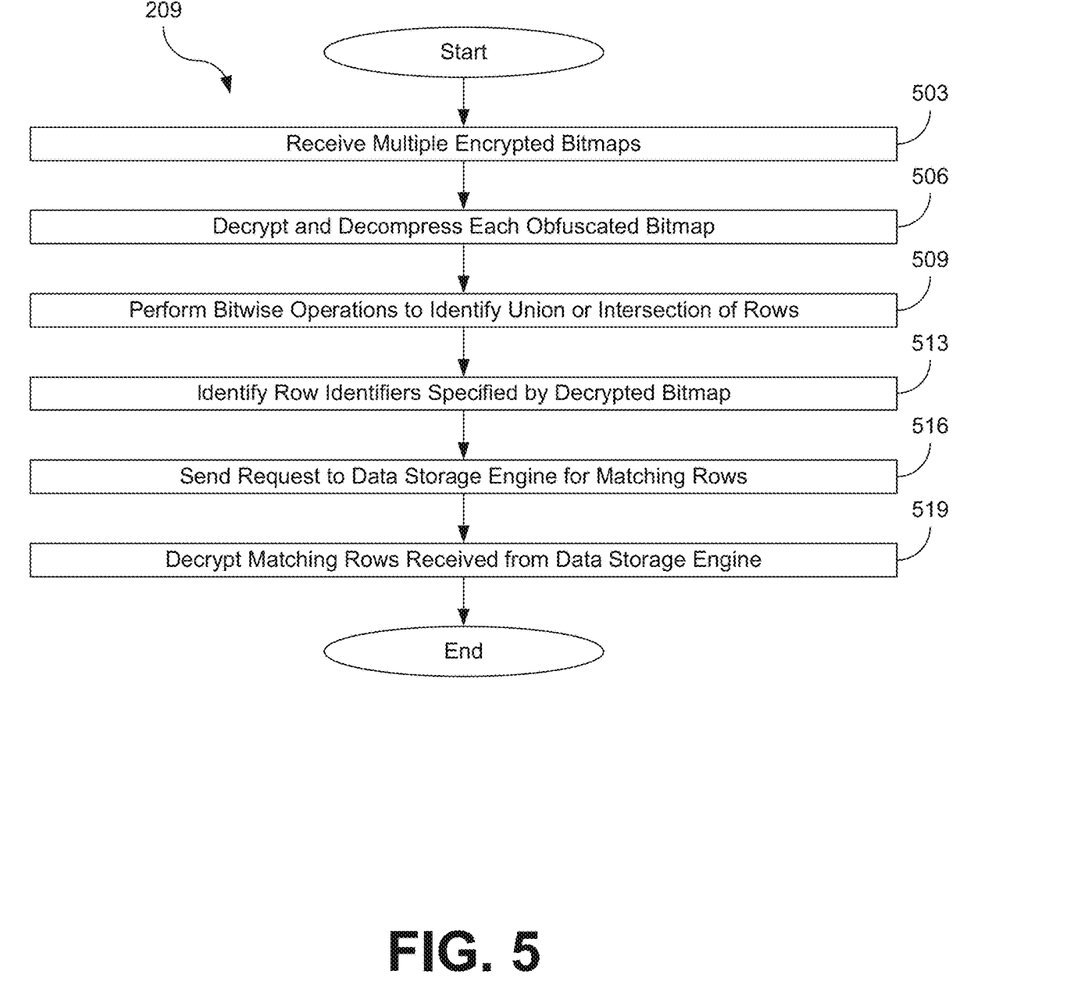

Referring next to FIG. 5, shown is a flowchart that provides one example of the operation of a portion of the client application 209 according to various embodiments. It is understood that the flowchart of FIG. 5 provides merely an example of the many different types of functional arrangements that may be employed to implement the operation of the portion of the client application 209 as described herein. As an alternative, the flowchart of FIG. 5 may be viewed as depicting an example of elements of a method implemented in the client device 103 (FIG. 2) according to one or more embodiments.

As previously discussed, the client application 209 may search for a single encrypted bitmap 266 (FIG. 2) in response to a simple search query or request. Likewise, unencrypted bitmaps 246 (FIG. 2) and encrypted bitmaps 266 can also be used to identify the results of more complicated searches, such as those where rows 223 (FIG. 2) matching a range of values in a column 226 (FIG. 2) of an encrypted data table 256 (FIG. 2) are being searched. However, the client application 209 can also use multiple unencrypted bitmaps 246 and encrypted bitmaps 266 to search for rows 223 that match a range of values in a column 226, rows 223 that match a set of values spanning multiple columns 226, or similarly complex searches. FIG. 5 describes an example flow for some of these more complex searches.

Beginning with box 503, the client application 209 receives multiple encrypted bitmaps 266 from the data storage engine 259 (FIG. 2). Each of the encrypted bitmaps 266 may be obtained using the portions of the process depicted in FIG. 4. As an illustrative example, the client application 209 could have requested eighteen encrypted bitmaps 266. Each of the requested encrypted bitmaps 266 could correspond to customer records where the customer was a specified age. For example, a first encrypted bitmap 266 could represent an index of all rows 223 of all bank account holders who are zero years old. A second encrypted bitmap 266 could represent an index of all rows 223 of bank account holding customers who are one year old. As illustrated, the remaining sixteen encrypted bitmaps 266 could represent account holders aged 2-17, with each encrypted bitmap 266 representing a single year.

Next at box 506, the client application 209 decrypts each of the encrypted bitmaps 266 using an appropriate encryption key 221 (FIG. 2) to generate an unencrypted bitmap 246. The client application 209 may also decompress each unencrypted bitmap 246 as required.

Then at box 509, the client application 209 can perform bitwise operations to identify specified unions or intersections of rows 223 indexed by the unencrypted bitmaps 246, as required for a particular query. Continuing the illustrative example, the client application 209 could perform a bitwise OR operation between all of the received encrypted bitmaps 266 to identify all rows 223 in a table of bank account holders that represent minors with bank accounts. As a result, an additional encrypted bitmap representing the rows 223 where the age is less than eighteen years old does not need to be created or stored.

Similarly, a bitwise AND operation could be used to identify all rows 223 that satisfy multiple criteria. For example, given a first unencrypted bitmap 246 that represented an index of rows 223 of all bank account holders in a particular state and a second unencrypted bitmap 246 that represented an index of rows 223 of all bank account holders who were legally adults (e.g., eighteen years old or older), a bitwise AND operation could be used to identify the rows 223 for all adult account holders in the specified state.

Proceeding to box 513, the client application 209 parses or otherwise uses bitshift operators to analyze the result of the bitwise operations performed at box 509 to identify the row identifiers 233 (FIG. 2) of the rows 223 identified as a result of the bitwise AND or bitwise OR operation.

Moving on to box 516, the client application 209 sends the row identifiers 233 to the data storage engine 259. The client application 209 then receives the respective rows 223 of the encrypted data table 253 in response. Next at box 519, the client application 209 decrypts the rows 223 of the encrypted data table 253 to access the data. Thereafter, execution of the depicted portion of the client application 209 ends.

Figure 6:
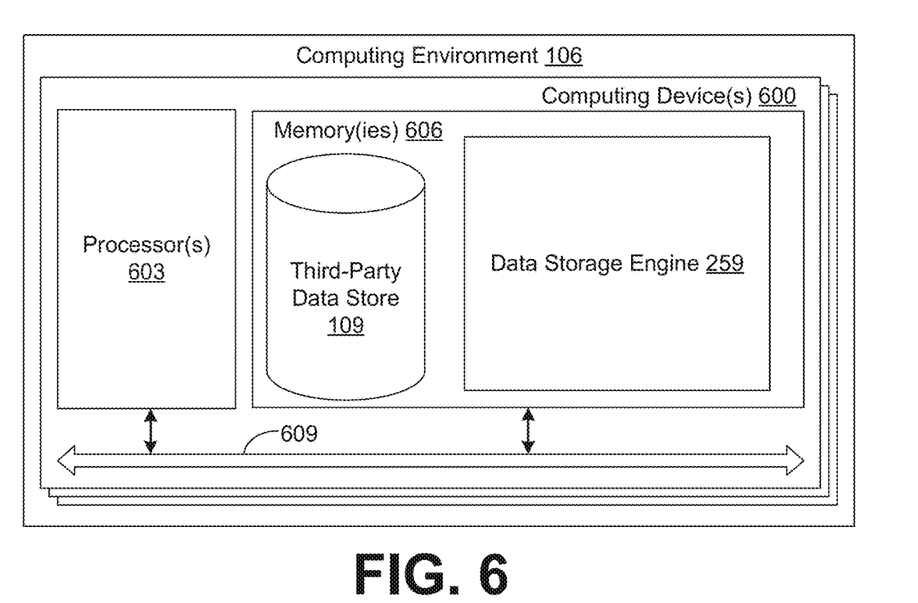
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 106 according to an embodiment of the present disclosure. The computing environment 106 includes one or more computing devices 600. Each computing device 600 includes at least one processor circuit, for example, having a processor 603 and a memory 606, both of which are coupled to a local interface 609. To this end, each computing device 600 may include, for example, at least one server computer or like device. The local interface 609 may include, for example, a data bus with an accompanying address/control bus or other bus structure as can be appreciated.

Stored in the memory 606 are both data and several components that are executable by the processor 603. In particular, stored in the memory 606 and executable by the processor 603 are data storage engine 259, and potentially other applications. Also stored in the memory 606 may be a third-party data store 109 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

Also, the processor 603 may represent multiple processors 603 or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606. The local interface 609 may include additional systems designed to coordinate this communication, including, for example, performing load balancing. The processor 603 may be of electrical or of some other available construction.

Figure 7:
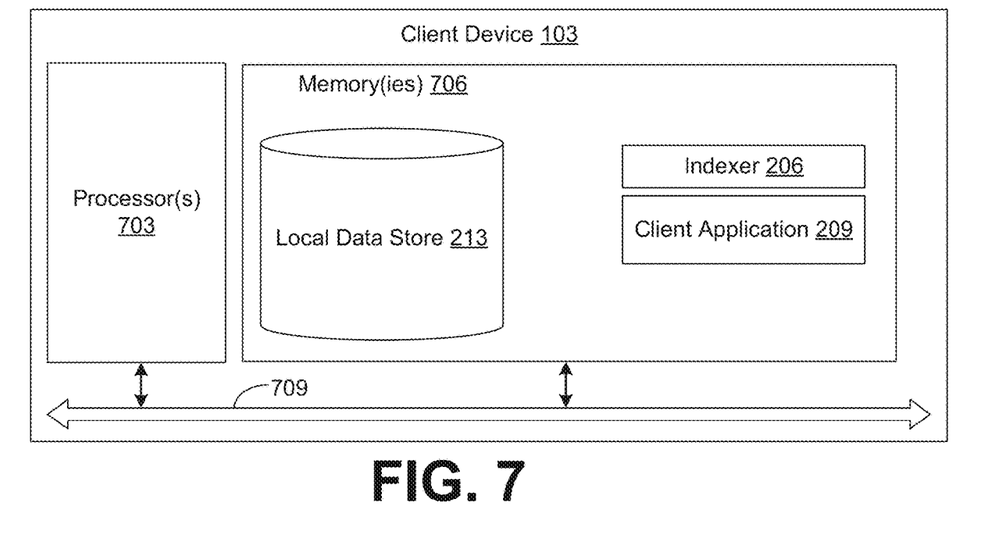
FIG. 7 is a schematic block diagram that provides one example illustration of a client device employed in the networked environment of FIG. 2 according to various embodiments of the present disclosure.

With reference to FIG. 7, shown is a schematic block diagram of a client device 103. Each client device 103 includes at least one processor circuit, for example, having a processor 703 and a memory 706, both of which are coupled to a local interface 709. The local interface 709 may include, for example, a data bus with an accompanying address/control bus or other bus structure as can be appreciated.

Stored in the memory 706 are both data and several components that are executable by the processor 703. In particular, stored in the memory 706 and executable by the processor 703 are the indexer 206, the client application 209, and potentially other applications. Also stored in the memory 706 may be a local data store 213 and other data. In addition, an operating system or firmware may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

Also, the processor 703 may represent multiple processors 703 or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706. The local interface 709 may include additional systems designed to coordinate this communication, including, for example, performing load balancing. The processor 703 may be of electrical or of some other available construction.

Although the indexer 206, the client application 209, the data storage engine 259, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-5 show the functionality and operation of an implementation of portions of the indexer 206 and the client application 209. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor 603 in a computer system or other system. The machine code may be converted from the source code through various processes. For example, the machine code may be generated from the source code with a compiler prior to execution of the corresponding application. As another example, the machine code may be generated from the source code concurrently with execution with an interpreter. Other approaches can also be used. If embodied in hardware, each block may represent a circuit or a number of interconnected circuits to implement the specified logical function or functions.

Although the flowcharts of FIGS. 3-5 show a specific order of execution, it is understood that the order of execution may differ from that which is depicted. For example, the order of execution of two or more blocks may be scrambled relative to the order shown. Also, two or more blocks shown in succession in FIGS. 3-5 may be executed concurrently or with partial concurrence. Further, in some embodiments, one or more of the blocks shown in FIGS. 3-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the indexer 206, the client application 209, the data storage engine 259, that includes software or code can be embodied in any non-transitory computer-readable medium for use by or in connection with an instruction execution system such as, for example, a processor 603 or a processor 703 in a computer system or other system. In this sense, the logic may include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the indexer 206, the client application 209, the data storage engine 259, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600 or client device 103, or in multiple computing devices in the same computing environment 106.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

The invention claimed is:

1. A system, comprising:
a first computing device comprising a processor and a memory;
machine-readable instructions stored in the memory that, when executed by the processor, cause the first computing device to at least:
send a message authentication code (MAC) to a second computing device in data communication with the first computing device, the MAC representing a tuple of a name of a data table, an identifier of a column of the data table, and a valid value for the column;
receive from the second computing device an encrypted bitmap stored by the second computing device in association with the MAC;
decrypt the encrypted bitmap to generate a decrypted bitmap;
perform bitwise operations on the decrypted bitmap to identify a plurality of encrypted rows of the data table containing a cell that comprises the valid value;
request at least the plurality of at least partially encrypted rows of the data table from the second computing device in data communication with the first computing device;
receive the plurality of at least partially encrypted rows of the data table; and
decrypt the plurality of at least partially encrypted rows of the data table to generate a respective plurality of decrypted rows.

2. The system of claim 1, wherein the machine-readable instructions, when executed by the processor, further cause the first computing to device to at least generate the MAC.

3. The system of claim 1, wherein
the machine-readable instructions, when executed by the processor, further cause the first computing to device to at least decompress the decrypted bitmap to generate a decompressed bitmap; and
wherein the machine-readable instructions that cause the first computing device to perform the bitwise operations on the decrypted bitmap to identify the plurality of at least partially encrypted rows of the data table containing the cell that comprises the valid value further cause the first computing device to perform the bitwise operations on the decompressed bitmap to identify the plurality of rows of the data table containing the cell that comprises the valid value.

4. The system of claim 1, wherein the machine-readable instructions, when executed by the processor, further cause the first computing to device to at least:
receive a database query; and
generate the tuple based at least in part on the database query.

5. The system of claim 4, wherein the machine-readable instructions that cause the first computing device to generate the tuple based at least in part on the database query further cause the first computing device to at least parse the database query to identify the name of the data table, the identifier of the column of the data table, and the valid value for the column.

6. The system of claim 1, wherein the machine-readable instructions, when executed by the processor, further cause the first computing to device to at least:
select a prepared database query from a plurality of prepared database queries associated with respective ones of a plurality of tuples; and
identify a respective tuple associated with the prepared database query from the plurality of tuples.

7. The system of claim 1, wherein:
the MAC is a first MAC representing a first tuple;
the identifier of the column is a first identifier of a first column of the data table;
the valid value is a first valid value for the first column;
the encrypted bitmap is a first encrypted bitmap;
the decrypted bitmap is a first decrypted bitmap;
the cell is a first cell; and
the machine-readable instructions, when executed by the processor, further cause the first computing device to at least:
generate a second MAC representing a second tuple of the name of the data table, a second identifier of a second column of the data table, and a second valid value for the second column;
send the second MAC to the second computing device in data communication with the first computing device;

receive from the second computing device a second encrypted bitmap stored by the second computing device in association with the second MAC;

decrypt the second encrypted bitmap to generate a second decrypted bitmap; and wherein the machine-readable instructions that cause the first computing device to perform bitwise operations on the first decrypted bitmap to identify the plurality of at least partially encrypted rows of the data table containing the first cell that comprises the first valid value further cause the first computing device to at least:

perform a bitwise AND operation on the first decrypted bitmap and the second decrypted bitmap to identify the plurality of at least partially encrypted rows of the data table containing the first cell that comprises the first valid value for the first column and a second cell that comprises the second valid value for the second column.

8. The system of claim 1, wherein:
the MAC is a first MAC representing a first tuple;
the identifier of the column is a first identifier of a first column of the data table;
the valid value is a first valid value for the first column;
the encrypted bitmap is a first encrypted bitmap;
the decrypted bitmap is a first decrypted bitmap;
the cell is a first cell; and
the method further comprises:

generating, via at least one of the one or more computing devices, a second MAC representing a second tuple of the name of the data table, a second identifier of a second column of the data table, and a second valid value for the second column;

sending, via at least one of the one or more computing devices, the second MAC to the computing device in data communication with the client device;

receiving, via at least one of the one or more computing devices, from the computing device a second encrypted bitmap stored by the computing device in association with the second MAC;

decrypting, via at least one of the one or more computing devices, the second encrypted bitmap to generate a second decrypted bitmap; and wherein performing, via at least one of the one or more computing devices, bitwise operations on the first decrypted bitmap to identify the plurality of at least partially encrypted rows of the data table containing the first cell that comprises the first valid value further comprises:

performing, via at least one of the one or more computing devices, a bitwise OR operation on the first decrypted bitmap and the second decrypted bitmap to identify the plurality of at least partially encrypted rows of the data table containing the first cell that comprises the first valid value for the first column and a second cell that comprises the second valid value for the second column.

9. A method, comprising:
sending, via at least one of one or more computing devices, a message authentication code (MAC) to a computing device in data communication with the one or more computing devices, the MAC representing a tuple of a name of a data table, an identifier of a column of the data table, and a valid value for the column;

receiving, via at least one of the one or more computing devices, from the computing device an encrypted bitmap stored by the computing device in association with the MAC;

decrypting, via at least one of the one or more computing devices, the encrypted bitmap to generate a decrypted bitmap;

performing, via at least one of the one or more computing devices, bitwise operations on the decrypted bitmap to identify a plurality of encrypted rows of the data table containing a cell that comprises the valid value;

requesting, via at least one of the one or more computing devices, at least the plurality of at least partially encrypted rows of the data table from the computing device in data communication with the one or more computing devices;

receiving, via at least one of the one or more computing devices, the plurality of at least partially encrypted rows of the data table; and decrypting, via at least one of the one or more computing devices, the plurality of at least partially encrypted rows of the data table to generate a respective plurality of decrypted rows.

10. The method of claim 9, further comprising generating, via at least one of the one or more computing devices, the MAC.

11. The method of claim 9, further comprising:
decompressing, via at least one of the one or more computing devices, the decrypted bitmap to generate a decompressed bitmap; and wherein performing the bitwise operations on the decrypted bitmap to identify the plurality of at least partially encrypted rows of the data table containing the cell that comprises the valid value further comprises performing, via at least one of the one or more computing devices, the bitwise operations on the decompressed bitmap to identify the plurality of rows of the data table containing the cell that comprises the valid value.

12. The method of claim 9, further comprising:
receiving, via at least one of the one or more computing devices, a database query; and generating, via at least one of the one or more computing devices, the tuple based at least in part on the database query.

13. The method of claim 12, wherein generating the tuple based at least in part on the database query further comprises parsing, via at least one of the one or more computing devices, the database query to identify the name of the data table, the identifier of the column of the data table, and the valid value for the column.

14. The method of claim 9, further comprising:
selecting, via at least one of the one or more computing devices, a prepared database query from a plurality of prepared database queries associated with respective ones of a plurality of tuples; and identifying, via at least one of the one or more computing devices, a respective tuple associated with the prepared database query from the plurality of tuples.

15. The method of claim 9, wherein:
the MAC is a first MAC representing a first tuple;
the identifier of the column is a first identifier of a first column of the data table;
the valid value is a first valid value for the first column;
the encrypted bitmap is a first encrypted bitmap;
the decrypted bitmap is a first decrypted bitmap;
the cell is a first cell; and the method further comprises:
generating, via at least one of the one or more computing devices, a second MAC representing a second tuple of the name of the data table, a second identifier of a second column of the data table, and a second valid value for the second column;
sending, via at least one of the one or more computing devices, the second MAC to the computing device in data communication with the one or more computing devices;
receiving, via at least one of the one or more computing devices, from the computing device a second encrypted bitmap stored by the computing device in association with the second MAC;
decrypting, via at least one of the one or more computing devices, the second encrypted bitmap to generate a second decrypted bitmap; and
wherein performing, via at least one of the one or more computing devices, bitwise operations on the first decrypted bitmap to identify the plurality of at least partially encrypted rows of the data table containing the first cell that comprises the first valid value further comprises:
performing, via at least one of the one or more computing devices, a bitwise AND operation on the first decrypted bitmap and the second decrypted bitmap to identify the plurality of at least partially encrypted rows of the data table containing the first cell that comprises the first valid value for the first column and a second cell that comprises the second valid value for the second column.

16. The method of claim 9, the MAC is a first MAC representing a first tuple;
the identifier of the column is a first identifier of a first column of the data table;
the valid value is a first valid value for the first column;
the encrypted bitmap is a first encrypted bitmap;
the decrypted bitmap is a first decrypted bitmap;
the cell is a first cell; and
the method further comprises:
generating, via at least one of the one or more computing devices, a second MAC representing a second tuple of the name of the data table, a second identifier of a second column of the data table, and a second valid value for the second column;
sending, via at least one of the one or more computing devices, the second MAC to the computing device in data communication with the one or more computing devices;
receiving, via at least one of the one or more computing devices, from the computing device a second encrypted bitmap stored by the computing device in association with the second MAC;
decrypting, via at least one of the one or more computing devices, the second encrypted bitmap to generate a second decrypted bitmap; and
wherein performing, via at least one of the one or more computing devices, bitwise operations on the first decrypted bitmap to identify the plurality of at least partially encrypted rows of the data table containing the first cell that comprises the first valid value further comprises:
performing, via at least one of the one or more computing devices, a bitwise OR operation on the first decrypted bitmap and the second decrypted bitmap to identify the plurality of at least partially encrypted rows of the data table containing the first cell that comprises the first valid value for the first column and a second cell that comprises the second valid value for the second column.

17. A non-transitory, computer-readable medium comprising machine-readable instruction that, when executed by a processor of a first computing device, cause the first computing device to at least:
send a message authentication code (MAC) to a second computing device in data communication with the first computing device, the MAC representing a tuple of a name of a data table, an identifier of a column of the data table, and a valid value for the column;
receive from the second computing device an encrypted bitmap stored by the second computing device in association with the MAC;
decrypt the encrypted bitmap to generate a decrypted bitmap;
perform bitwise operations on the decrypted bitmap to identify a plurality of encrypted rows of the data table containing a cell that comprises the valid value;
request at least the plurality of at least partially encrypted rows of the data table from the second computing device in data communication with the first computing device;
receive the plurality of at least partially encrypted rows of the data table; and
decrypt the plurality of at least partially encrypted rows of the data table to generate a respective plurality of decrypted rows.

18. The non-transitory, computer-readable medium of claim 17, wherein
the machine-readable instructions, when executed by the processor, further cause the first computing to device to at least decompress the decrypted bitmap to generate a decompressed bitmap; and
wherein the machine-readable instructions that cause the first computing device to perform the bitwise operations on the decrypted bitmap to identify the plurality of at least partially encrypted rows of the data table containing the cell that comprises the valid value further cause the first computing device to perform the bitwise operations on the decompressed bitmap to identify the plurality of rows of the data table containing the cell that comprises the valid value.

19. The non-transitory, computer-readable medium of claim 17, wherein the machine-readable instructions, when executed by the processor, further cause the first computing to device to at least:
select a prepared database query from a plurality of prepared database queries associated with respective ones of a plurality of tuples; and
identify a respective tuple associated with the prepared database query from the plurality of tuples.

20. The non-transitory, computer-readable medium of claim 17, wherein the machine-readable instructions, when executed by the processor, further cause the first computing to device to at least:
receive a database query; and
generate the tuple based at least in part on the database query.

* * * * *